Oct. 22, 1929.    R. N. RIBLET    1,732,484

TRACTION OR SUPPORTING WHEEL

Filed Dec. 22, 1928

ROYAL N. RIBLET
Inventor

By Herbert E. Smith

Attorney

Patented Oct. 22, 1929

1,732,484

UNITED STATES PATENT OFFICE

ROYAL N. RIBLET, OF SPOKANE, WASHINGTON

TRACTION OR SUPPORTING WHEEL

Application filed December 22, 1928. Serial No. 327,762.

My invention relates to an improved traction or supporting wheel of the type in which the vehicle travels upon a portable track, or endless, annular, flexible, linked tread carried by the wheel, which wheel is provided with a rim portion for engaging the ground plates or tread plates of the flexible traction tread. The present invention is an improvement on the structure forming the subject matter of my Patent No. 1,134,960, for traction wheels, dated April 6, 1915, and in carrying out the present invention I provide a more rugged, stronger, and more durable traction implement, which can with facility be keyed to the axle or shaft of an automotive vehicle. One of the present traction or supporting wheels is used at each of the opposite ends of the driving shaft, or axle, and each of these wheels comprises two spaced bearing spiders or sprockets, rigid with and rotatable with the driving shaft, and two relatively movable, annular or circular disks attached to a hub, the latter being loosely journaled on the shaft. Each wheel structure carries an annular, flexible, traction linked tread provided with teeth for coaction with the teeth of the sprockets, and the tread plates of the linked tread have ribs for frictional engagement with the rims of the sprockets.

Means are provided within the wheel for flexing the tread so that a plurality of tread plates are continuously maintained upon the ground surface as a track upon which the wheel travels. The invention resides in certain novel arrangements of parts and certain combinations between the wheel members and the traction treads, as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1:
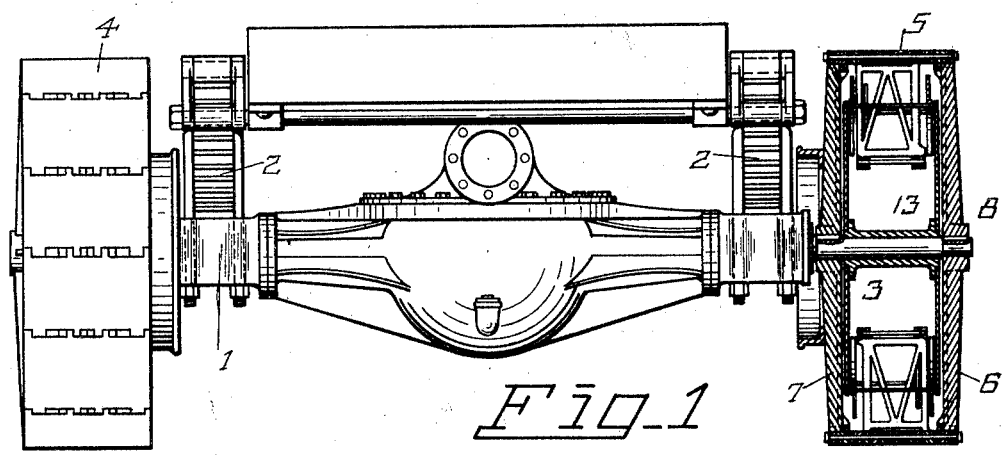
Figure 1 is a view in rear elevation of an automotive vehicle equipped with the driving or traction wheels of my invention, one of which wheels is shown in rear elevation and the other shown in section for convenience of illustration.

In order that the general relation and arrangement of parts may readily be understood I have illustrated in Figure 1 the rear portion of a heavy duty automotive truck, including the rear axle or housing 1 for the driving shaft, springs 2, and the journal ends 3 of the driving shaft that extends transversely of the vehicle. The right and left driving or traction wheels are complementary to one another, the left one being designated as 4 and the right one as 5, and the detailed description of one will suffice for both.

Each of the wheels, indicated as a whole by the numerals 4 and 5, comprises the inner sprocket 7 and outer sprocket 6, spaced a suitable distance apart, and having their hubs 8 keyed to and revolvable with the journals 3 of the driving shaft.

Each sprocket has a circular rim 9, and on the exterior periphery of the rim is arranged a series of radially projecting teeth 10. Any number of teeth may be carried, but for convenience of illustration I have utilized forty of the teeth spaced at equidistant intervals around the periphery of the rim, and integral therewith.

Within the space between the sprockets and adjacent the sprockets are located a pair of circular disks 11 and 12, and these outer and inner disks are rigid with a hub 13 that is loosely journaled on the end of the driving shaft between the hubs 8 of the relatively movable sprockets, which hubs 8 are, as stated before, rigid with the journal.

The traction tread carried by the wheel, in this instance, is made up of sixteen tread plates 14, and the arrangement is such that when two plates of four pairs are in alinement, the two plates of the other four pairs are always flexed, and the flexed pairs are flexed with relation to the alined pairs. Thus, in Figure 2, a pair of alined or substantially alined plates, is continuously on the ground and forms the track over which the wheel travels.

Each plate is fashioned with an inner reinforcing, transverse, web 15, and a pair of parallel, spaced, side ribs 17 that ride on the rims of the sprocket wheels. At the opposite ends of the plates are arranged integral, intermediate, perforated ears or lugs 16, and in the ends of the ribs are alined perforations 18. The hinge bolts 19 pass through complementary lugs and perforations on the adjoining edges of the pairs of plates so that the tread plates may readily flex at the joints.

Along the inner sides of the tread plates 17 are arranged teeth 20 forming spaces therebetween for the teeth of the sprockets 6 and 7. There are three teeth on each side of each plate making a series of forty-eight teeth at each side of a linked tread for co-action with the forty teeth of the sprockets, thus allowing four pairs of plates to be engaged by the teeth of the sprockets and four pairs of plates to be disengaged from the sprockets at all times.

The flexing of the treads at their joints is initiated by the relative movement between the sprockets and disks when the weight of the wheel or load is imposed on the wheel. The operation is carried out through pairs of links 21 arranged in an annular series within the interior of the wheel, and each link is pivoted at its outer end on a hinge bolt 19 located between pairs of tread plates. The links, in pairs, form V-shape devices with the apices thereof forming the pivotal points on the hinge bolts, and the inner free ends of the links of the pairs are spread apart or drawn together as the load is alternately imposed on and removed from a pair of links. That is, when a pair of tread plates are alined, the inner ends of the pair of links pivoted at the joint between these treads are spread apart, and when these same tread plates are flexed, the free, inner ends of these links are drawn together.

The inner free ends of the links are pivoted at 22 at the opposite ends of rocker arms 23, and these rocker arms are centrally pivoted at 24 near the peripheries of the disks 11 and 12. The two sets of rocker arms 23, one set pivoted on disk 11 and the other set pivoted on disk 12, are arranged so that the rocker arms in each set overlap, each alternate arm being inset to provide this arrangement.

The rocker arms may conveniently be of cresent shape, and they are interchangeable, as are also the links 21 and the plates 14 interchangeable.

Figures 2, 3:
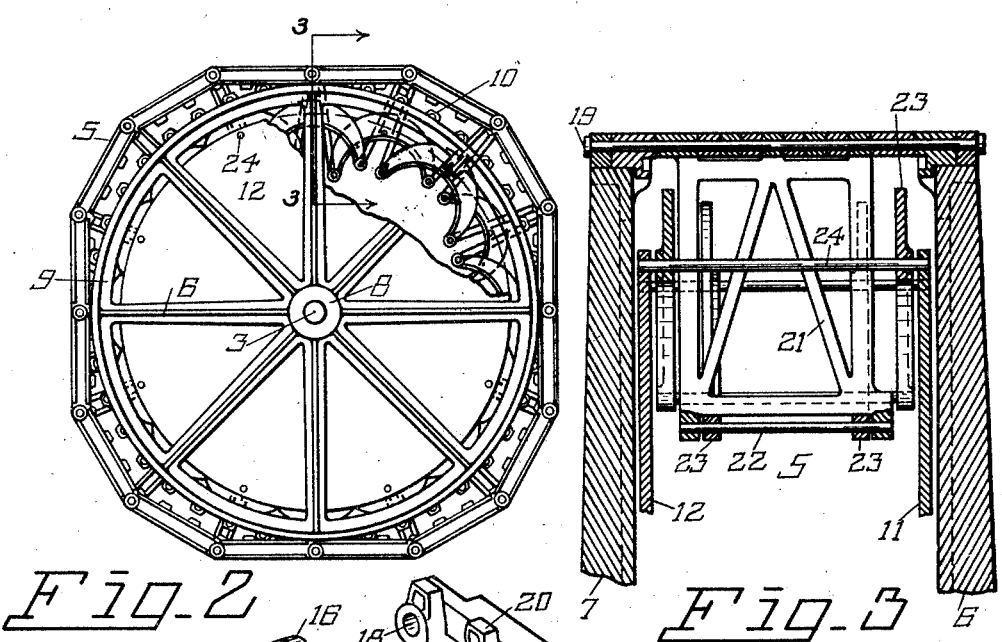
Figure 2 is a view in side elevation of one of the wheels in position when bearing a load imposed upon the axle or driving shaft.
Figure 3 is an enlarged vertical sectional view on the line 3—3 of Figure 2.
Figure 4:
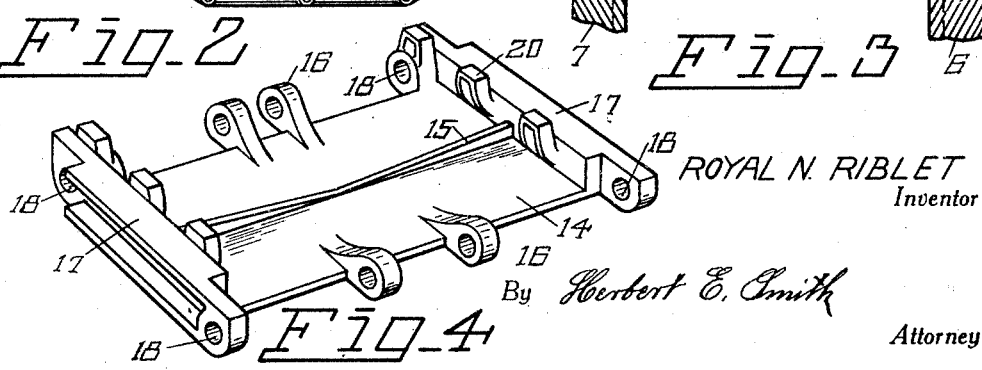
Figure 4 is a perspective view of one of the tread plates as seen from its inner side.

When the wheel is placed on the ground, the wheel members will tend to settle, and consequently the pivot pins 24 that happen to be on the lower edge of the wheel will be carried downwardly into the position of Figure 2, carrying with them the corresponding rocker arms, and bringing with them the two lower tread plates or bearing plates into alinement. Due to the continuous connection of the various members around the wheel, its shape will remain symmetrical at all times with four diametrically arranged pairs of alined tread plates and four alternating pairs of diagonally disposed flexed plates in the peripheral contour of the wheel.

Having thus fully described my invention, what I claim as new and desire to secure by Letters Patent is:—

1. In a traction wheel, the combination with a driving journal, a pair of spaced sprockets rigid with the journal and rim-teeth on the sprockets, of a pair of disks loose on the journal, an annular flexible traction linked tread having teeth complementary to the teeth of the sprockets, and pivoted members between the disks and linked treads for alining and flexing alternate pairs of tread members of the traction linked tread.

2. In a traction wheel, the combination with a driving journal, a pair of spaced sprockets rigid with the journal and rim-teeth on the sprockets, of a pair of disks loose on the journal, an annular, flexible traction linked tread comprising hinged tread plates, teeth on the tread plates complementary to the teeth of the sprockets, and means between the disks and sprockets for outwardly flexing and inwardly alining alternate pairs of hinged plates.

3. In a traction wheel, the combination with a driving journal, a pair of spaced sprockets rigid with the journal and rim-teeth on the sprockets, of a pair of disks loose on the journal, an annular, flexible traction linked tread comprising hinged tread plates, spaced side ribs on the plates for frictional contact with the sprockets, teeth on the inner sides of the plates complementary to the teeth of the sprockets, and means between the disks and linked tread for outwardly flexing and inwardly alining alternate pairs of hinged plates.

In testimony whereof I affix my signature.

ROYAL N. RIBLET.